(12) United States Patent
Uchida et al.

(10) Patent No.: US 11,994,176 B2
(45) Date of Patent: May 28, 2024

(54) CLUTCH ACTUATOR

(71) Applicant: DENSO CORPORATION, Kariya (JP)

(72) Inventors: Akikazu Uchida, Kariya (JP); Takumi Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/327,501

(22) Filed: Jun. 1, 2023

(65) Prior Publication Data
US 2023/0304544 A1  Sep. 28, 2023

Related U.S. Application Data

(63) Continuation of application No. PCT/JP2021/043903, filed on Nov. 30, 2021.

(30) Foreign Application Priority Data

Dec. 3, 2020 (JP) .................................. 2020-201318
Apr. 20, 2021 (JP) .................................. 2021-070782

(51) Int. Cl.
*F16D 28/00* (2006.01)
*F16D 121/24* (2012.01)
*F16D 125/50* (2012.01)

(52) U.S. Cl.
CPC .......... *F16D 28/00* (2013.01); *F16D 2121/24* (2013.01); *F16D 2125/50* (2013.01)

(58) Field of Classification Search
CPC .... F16D 23/12; F16D 13/52; F16D 2023/123; F16D 2125/36; F16D 2125/50;
(Continued)

(56) References Cited

U.S. PATENT DOCUMENTS 4,572,313 A * 2/1986 Ono ...................... B62D 1/105
 74/498
10,399,437 B2 * 9/2019 Ruscak .................... F16H 1/28
(Continued)

FOREIGN PATENT DOCUMENTS

JP      2016101877 A     6/2016

OTHER PUBLICATIONS

U.S. Appl. No. 18/327,640 to Soichiro Hayashi et al., filed Jun. 1, 2023 (48 pages).
(Continued)

*Primary Examiner* — Jacob S. Scott
*Assistant Examiner* — Farhana Pervin
(74) *Attorney, Agent, or Firm* — Nixon & Vanderhye P.C.

(57) ABSTRACT

A prime mover is provided in a housing, and can operate by energization and output a torque. A speed reducer can decelerate and output the torque of the prime mover. A rotational translation unit including a rotation portion that rotates relative to the housing when the torque output from the speed reducer is input, and a translation portion that moves relative to the housing in an axial direction when the rotation portion rotates relative to the housing and can change a state of a clutch to an engaged state or a non-engaged state. The speed reducer includes an output unit that outputs the decelerated torque of the prime mover to the rotation portion. The rotation portion is formed of a material different from that of the output unit separately, and is provided to be rotatable integrally with the output unit.

10 Claims, 7 Drawing Sheets

(58) Field of Classification Search
CPC .......... F16D 13/46; F16D 28/00; F16D 48/02; F16D 48/06; F16D 13/32; F16D 43/26; F16D 2121/24; F16H 37/124; F16H 3/54; F16H 13/14; F16H 2200/0034; F16H 1/28; F16H 1/46; F16H 25/12; F16H 1/32; H02K 7/108; H02K 7/116; H02K 49/00

See application file for complete search history.

(56) References Cited

U.S. PATENT DOCUMENTS

| | | | | |
|---|---|---|---|---|
| 2005/0205377 | A1* | 9/2005 | Borgerson | F16D 28/00 |
| | | | | 192/48.92 |
| 2015/0144453 | A1* | 5/2015 | Larkin | B60K 17/35 |
| | | | | 192/84.7 |
| 2016/0238107 | A1 | 8/2016 | Hirota et al. | |
| 2017/0128234 | A1* | 5/2017 | Roh | F16H 57/0006 |
| 2017/0234373 | A1* | 8/2017 | Palazzolo | B60K 17/35 |
| | | | | 192/84.6 |
| 2019/0160654 | A1* | 5/2019 | Moritani | H02K 21/14 |
| 2019/0390736 | A1 | 12/2019 | Dai et al. | |
| 2021/0033184 | A1* | 2/2021 | Lundstrom | B60K 23/0808 |
| 2022/0001735 | A1* | 1/2022 | Finkenzeller | F16D 13/54 |
| 2023/0167880 | A1* | 6/2023 | Lauermann | F16H 1/32 |
| | | | | 74/640 |

OTHER PUBLICATIONS

U.S. Appl. No. 18/327,381 to Tomonori Suzuki et al., filed Jun. 1, 2023 (39 pages).
U.S. Appl. No. 18/327,597 to Akira Takagi et al., filed Jun. 1, 2023 (54 pages).
U.S. Appl. No. 18/327,424 to Akira Takagi et al., filed Jun. 1, 2023 (77 pages).
U.S. Appl. No. 18/327,806 to Tomonori Suzuki et al., filed Jun. 1, 2023 (37 pages).
U.S. Appl. No. 18/327,333 to Motoki Ichihara et al., filed Jun. 1, 2023 (54 pages).
U.S. Appl. No. 18/327,515 to Takumi Sugiura et al., filed Jun. 1, 2023 (88 pages).

\* cited by examiner

CLUTCH ACTUATOR

CROSS REFERENCE TO RELATED APPLICATION

The present application is a continuation application of International Patent Application No. PCT/JP2021/043903 filed on Nov. 30, 2021, which designated the U.S. and claims the benefit of priority from Japanese Patent Applications No. 2020-201318 filed on Dec. 3, 2020 and No. 2021-070782 filed on Apr. 20, 2021. The entire disclosures of all of the above applications are incorporated herein by reference.

TECHNICAL FIELD

The present disclosure relates to a clutch actuator.

BACKGROUND

A known clutch actuator is configured to change a state of a clutch that is provided between transmission objects which are rotatable relative to each other.

SUMMARY

According to an aspect of the present disclosure, a clutch actuator is to be used in a clutch device.

BRIEF DESCRIPTION OF THE DRAWINGS

The above and other objects, features, and advantages of the present disclosure will become more apparent from the following detailed description with reference to the accompanying drawings. In the drawings.

DETAILED DESCRIPTION

Figure 1:
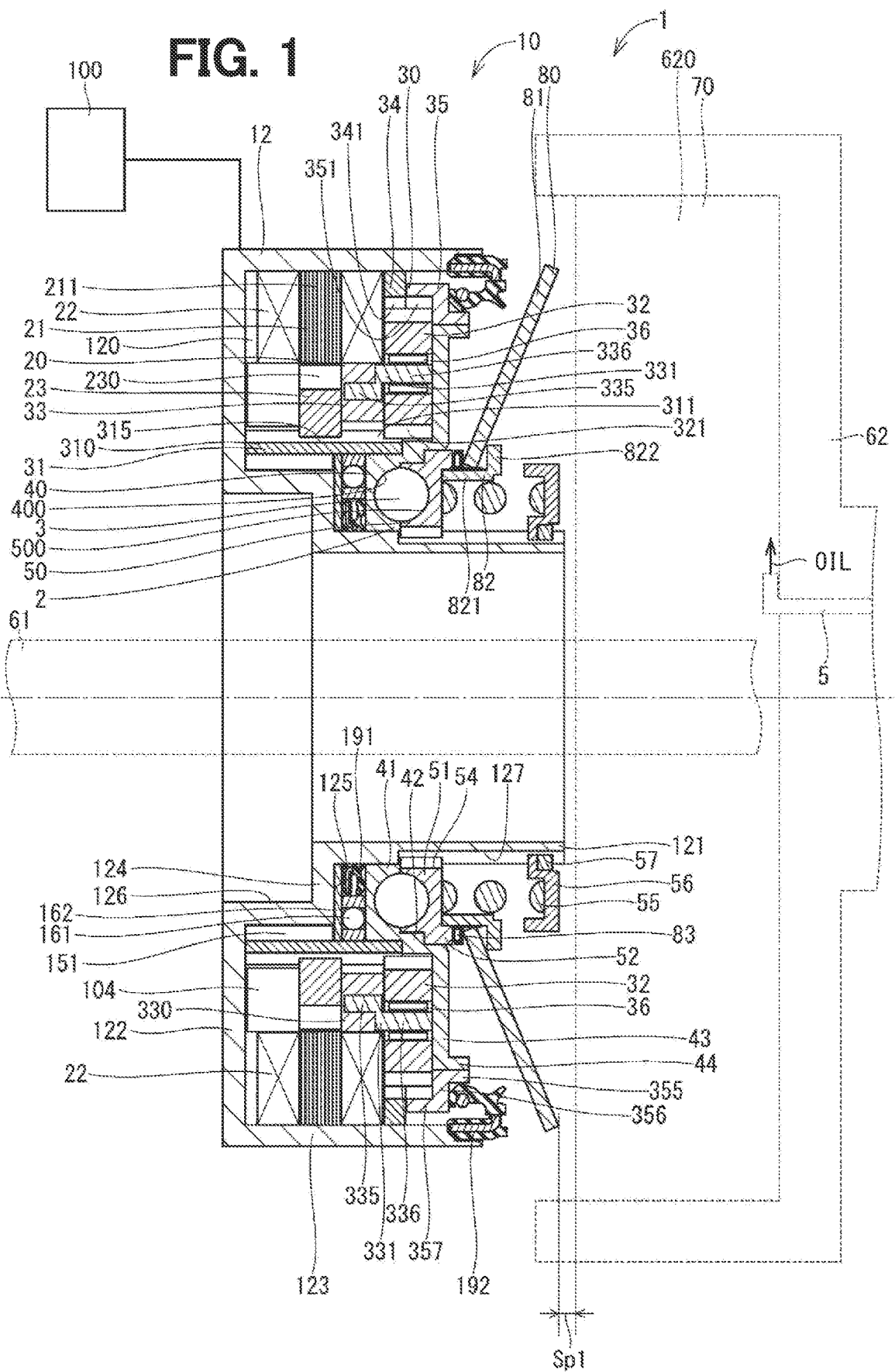
FIG. 1 is a cross-sectional view showing a clutch actuator according to a first embodiment and a clutch device to which the clutch actuator is applied.

Hereinafter, examples of the present disclosure will be described.

According to an example of the present disclosure, a clutch actuator is capable of changing a state of a clutch that is provided between a first transmission portion and a second transmission portion which are rotatable relative to each other, and whose state is changed between an engaged state in which torque transmission between the first transmission portion and the second transmission portion is permitted and a non-engaged state in which the torque transmission between the first transmission portion and the second transmission portion is blocked.

For example, in a clutch actuator, a ball cam includes a cam portion in which a cam groove is formed, a ball that rolls on the cam groove, and a driven cam portion that is movable in an axial direction by rolling of the ball sandwiched between a cam groove and the cam groove of the cam portion. When the driven cam portion moves in the axial direction, a state of a clutch can be changed to an engaged state or a non-engaged state.

In the clutch actuator, for example, the cam portion is fixed to a housing so as not to be rotatable relative to the housing. When a torque output from a speed reducer is input, the driven cam portion rotates relative to the housing, and when the ball rolls, the driven cam portion moves relative to the housing in the axial direction.

In the clutch actuator, for example, the cam portion is formed in a complicated shape. In this configuration, moldability may become low. In addition, for example, in the clutch actuator, the driven cam portion in which the cam groove is formed and a gear portion as an output unit of the speed reducer from which the torque is output are integrally formed. Therefore, when a variation such as a shape is set in the output unit of the speed reducer, it is necessary to recreate the entire component.

According to an example of the present disclosure, a clutch actuator is to be used in a clutch device. The clutch device includes a clutch provided between a first transmission portion and a second transmission portion that are rotatable relative to each other and whose state is changeable to an engaged state in which torque transmission between the first transmission portion and the second transmission portion is permitted or a non-engaged state in which the torque transmission between the first transmission portion and the second transmission portion is blocked. The clutch actuator includes a housing, a prime mover, a speed reducer, and a rotational translation unit.

The prime mover is provided in a housing, and can operate by energization and output a torque. The speed reducer can decelerate and output the torque of the prime mover. The rotational translation unit includes a rotation portion that rotates relative to the housing when the torque output from the speed reducer is input, and a translation portion that moves relative to the housing in an axial direction when the rotation portion rotates relative to the housing and is configured to change a state of a clutch to an engaged state or a non-engaged state.

The speed reducer includes an output unit that outputs the decelerated torque of the prime mover to the rotation portion. The rotation portion and the output unit are separately formed of different materials, and the rotation portion is provided to be rotatable integrally with the output unit. Therefore, it is possible to easily set a variation of a speed reducer that shares the rotation portion, which is relatively difficult to manufacture. In addition, by separately forming the output unit and the rotation portion, moldability is improved, and manufacturing easiness and cost reduction can be achieved by adopting optimum materials and optimum machining methods of the output unit and the rotation portion.

Hereinafter, clutch actuators according to multiple embodiments will be described with reference to the drawings. In the multiple embodiments, substantially the same components are denoted by the same reference numerals, and description thereof is omitted.

First Embodiment

Figure 2:
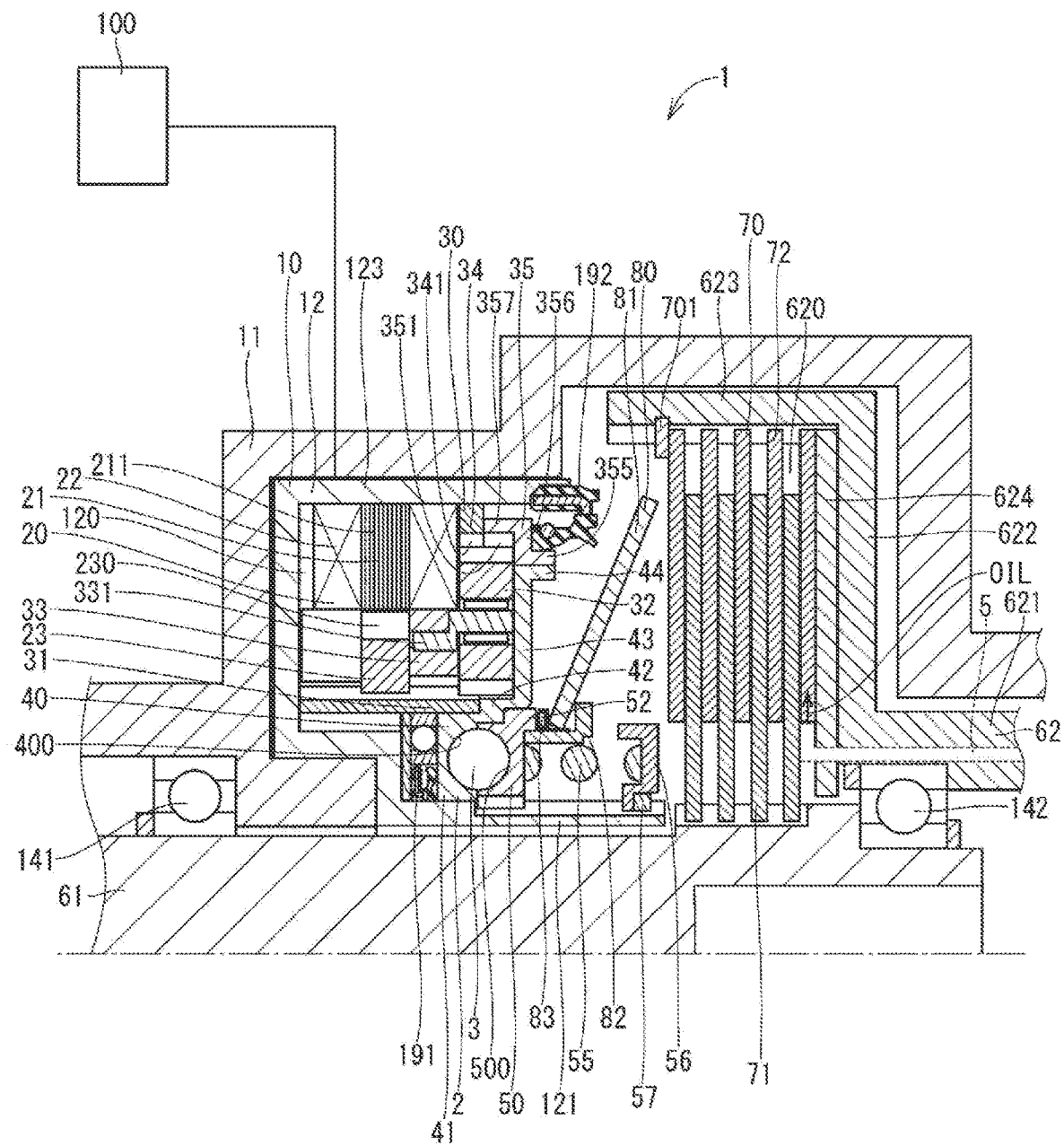
FIG. 2 is a cross-sectional view showing a part of the clutch actuator according to the first embodiment and the clutch device.

FIGS. 1 and 2 show a clutch device to which a clutch actuator according to a first embodiment is applied. A clutch device 1 is provided, for example, between an internal combustion engine and a transmission of a vehicle, and is used to permit or block torque transmission between the internal combustion engine and the transmission.

The clutch device 1 includes a clutch actuator 10, a clutch 70, an electronic control unit (hereinafter referred to as "ECU") 100 as a "control unit", an input shaft 61 as a "first transmission portion", an output shaft 62 as a "second transmission portion", and the like.

The clutch actuator 10 includes a housing 12, a motor 20 as a "prime mover", a speed reducer 30, a ball cam 2 as a "rotational translation unit" or a "rolling body cam", a state changing unit 80, and the like.

The ECU 100 is a small computer including a CPU as a calculation means, a ROM, a RAM, and the like as a storage means, an I/O as an input and output means, and the like. The ECU 100 executes calculation according to a program stored in the ROM or the like based on information such as signals from various sensors provided in each part of the vehicle, and controls operations of various devices and machines of the vehicle. In this way, the ECU 100 executes a program stored in a non-transitory tangible storage medium. By executing the program, a method corresponding to the program is executed.

The ECU 100 can control an operation of the internal combustion engine and the like based on the information such as the signals from various sensors. The ECU 100 can also control an operation of the motor 20 to be described later.

The input shaft 61 is connected to, for example, a drive shaft (not shown) of the internal combustion engine, and is rotatable together with the drive shaft. That is, a torque is input to the input shaft 61 from the drive shaft.

The vehicle equipped with the internal combustion engine is provided with a fixed body 11 (see FIG. 2). The fixed body 11 is formed, for example, in a tubular shape, and is fixed to an engine compartment of the vehicle. A ball bearing 141 is provided between an inner peripheral wall of the fixed body 11 and an outer peripheral wall of the input shaft 61. Accordingly, the input shaft 61 is bearing-supported by the fixed body 11 via the ball bearing 141.

The housing 12 is provided between the inner peripheral wall of the fixed body 11 and the outer peripheral wall of the input shaft 61. The housing 12 includes a housing inner cylinder portion 121, a housing plate portion 122, a housing outer cylinder portion 123, a housing small plate portion 124, a housing step surface 125, a housing small inner cylinder portion 126, housing-side spline groove portions 127, and the like.

The housing inner cylinder portion 121 is formed in a substantially cylindrical shape. The housing small plate portion 124 is formed in an annular plate shape to extend to a radially outer side from an end portion of the housing inner cylinder portion 121. The housing small inner cylinder portion 126 is formed in a substantially cylindrical shape to extend from an outer edge portion of the housing small plate portion 124 to a side opposite to the housing inner cylinder portion 121. The housing plate portion 122 is formed in an annular plate shape to extend to the radially outer side from an end portion of the housing small inner cylinder portion 126 on a side opposite to the housing small plate portion 124. The housing outer cylinder portion 123 is formed in a substantially cylindrical shape to extend from an outer edge portion of the housing plate portion 122 to the same side as the housing small inner cylinder portion 126 and the housing inner cylinder portion 121. Here, the housing inner cylinder portion 121, the housing small plate portion 124, the housing small inner cylinder portion 126, the housing plate portion 122, and the housing outer cylinder portion 123 are integrally formed of, for example, metal.

As described above, the housing 12 is formed in a hollow and flat shape as a whole.

The housing step surface 125 is formed in an annular planar shape on a surface of the housing small plate portion 124 on a side opposite to the housing small inner cylinder portion 126. The housing-side spline groove portion 127 is formed in an outer peripheral wall of the housing inner cylinder portion 121 to extend in an axial direction of the housing inner cylinder portion 121. Multiple housing-side spline groove portions 127 are formed in a circumferential direction of the housing inner cylinder portion 121.

The housing 12 is fixed to the fixed body 11 such that a part of an outer wall is in contact with a part of a wall surface of the fixed body 11 (see FIG. 2). The housing 12 is fixed to the fixed body 11 by bolts (not shown) or the like. Here, the housing 12 is provided coaxially with the fixed body 11 and the input shaft 61. In addition, a substantially cylindrical space is formed between an inner peripheral wall of the housing inner cylinder portion 121 and the outer peripheral wall of the input shaft 61.

The housing 12 has an accommodation space 120 as a "space". The accommodation space 120 is defined by the housing inner cylinder portion 121, the housing small plate portion 124, the housing small inner cylinder portion 126, the housing plate portion 122, and the housing outer cylinder portion 123.

The motor 20 is accommodated in the accommodation space 120. The motor 20 includes a stator 21, a rotor 23, and the like. The stator 21 includes a stator core 211 and a coil 22. The stator core 211 is formed by, for example, a laminated steel plate in a substantially annular shape, and is fixed inside the housing outer cylinder portion 123. The coil 22 is provided on each of multiple salient poles of the stator core 211.

The motor 20 includes a magnet 230 as a "permanent magnet". The rotor 23 is formed of, for example, iron-based metal in a substantially annular shape. More specifically, the rotor 23 is formed of, for example, pure iron having a relatively high magnetic property.

The magnet 230 is provided on an outer peripheral wall of the rotor 23. Multiple magnets 230 are provided at equal intervals in a circumferential direction of the rotor 23 such that magnetic poles are alternately arranged.

The clutch actuator 10 includes a bearing 151. The bearing 151 is provided on an outer peripheral wall of the housing small inner cylinder portion 126. A sun gear 31, which will be described later, is provided on the radially outer side of the bearing 151. The rotor 23 is provided on the radially outer side of the sun gear 31 so as not to be rotatable relative to the sun gear 31. The bearing 151 is provided in the accommodation space 120 and rotatably supports the sun gear 31, the rotor 23, and the magnets 230.

The ECU 100 can control the operation of the motor 20 by controlling electric power supplied to the coil 22. When the electric power is supplied to the coil 22, a rotating magnetic field is generated in the stator core 211, and the rotor 23 rotates. Accordingly, the torque is output from the rotor 23. In this way, the motor 20 includes the stator 21 and the rotor 23 provided rotatably relative to the stator 21, and can output the torque from the rotor 23 by being supplied with electric power.

Here, the rotor 23 is provided on a radially inner side of the stator core 211 of the stator 21 to be rotatable relative to the stator 21. The motor 20 is an inner rotor-type brushless DC motor.

In the present embodiment, the clutch actuator 10 includes a rotation angle sensor 104. The rotation angle sensor 104 is provided in the accommodation space 120.

The rotation angle sensor 104 detects a magnetic flux generated from a sensor magnet rotating integrally with the rotor 23, and outputs a signal corresponding to the detected magnetic flux to the ECU 100. Accordingly, the ECU 100 can detect a rotation angle, a rotation speed, and the like of the rotor 23 based on the signal from the rotation angle sensor 104. In addition, the ECU 100 can calculate, based on the rotation angle, the rotation speed, and the like of the rotor 23, a relative rotation angle of a drive cam 40 with respect to the housing 12 and a driven cam 50 to be described later, relative positions of the driven cam 50 and the state changing unit 80 in the axial direction with respect to the housing 12 and the drive cam 40, and the like.

The speed reducer 30 is accommodated in the accommodation space 120. The speed reducer 30 includes the sun gear 31, a planetary gear 32, a carrier 33, a first ring gear 34, a second ring gear 35, and the like.

The sun gear 31 is provided coaxially with and integrally rotatably with the rotor 23. That is, the rotor 23 and the sun gear 31 are separately formed, and are coaxially arranged to be integrally rotatable.

More specifically, the sun gear 31 includes a sun gear main body 310, a sun gear tooth portion 311 as a "tooth portion" and "external teeth", and a gear-side spline groove portion 315. The sun gear main body 310 is formed of, for example, metal in a substantially cylindrical shape. The gear-side spline groove portion 315 is formed to extend in the axial direction on an outer peripheral wall of the sun gear main body 310 on one end portion side. Multiple gear-side spline groove portions 315 are formed in a circumferential direction of the sun gear main body 310. The one end portion side of the sun gear main body 310 is bearing-supported by the bearing 151.

Spline groove portions corresponding to the gear-side spline groove portions 315 are formed in an inner peripheral wall of the rotor 23. The rotor 23 is located on the radially outer side of the sun gear 31, and the spline groove portions are provided to be spline-coupled to the gear-side spline groove portions 315. Accordingly, the rotor 23 is not rotatable and is movable in the axial direction relative to the sun gear 31.

The sun gear tooth portion 311 is formed on an outer peripheral wall of the sun gear 31 on the other end portion side. The torque of the motor 20 is input to the sun gear 31 that rotates integrally with the rotor 23. Here, the sun gear 31 corresponds to an "input unit" of the speed reducer 30. In the present embodiment, the sun gear 31 is formed of, for example, a steel material.

Multiple planetary gears 32 are provided in a circumferential direction of the sun gear 31, and can revolve in the circumferential direction of the sun gear 31 while meshing with the sun gear 31 and rotating on its axis. More specifically, the planetary gears 32 each are formed of, for example, metal in a substantially cylindrical shape, and four planetary gears 32 are provided at equal intervals in the circumferential direction of the sun gear 31 on the radially outer side of the sun gear 31. Each planetary gear 32 includes a planetary gear tooth portion 321 as a "tooth portion" and "external teeth". The planetary gear tooth portion 321 is formed on an outer peripheral wall of the planetary gear 32 to mesh with the sun gear tooth portion 311.

The carrier 33 rotatably supports the planetary gears 32 and is rotatable relative to the sun gear 31. More specifically, the carrier 33 is provided on the radially outer side of the sun gear 31. The carrier 33 is rotatable relative to the rotor 23 and the sun gear 31.

The carrier 33 includes a carrier main body 330 and a pin 331. The carrier main body 330 is formed of, for example, metal in a substantially annular shape. The carrier main body 330 is located between the sun gear 31 and the coil 22 in the radial direction, and is located between the rotor 23 and the magnet 230 and the planetary gear 32 in the axial direction. The planetary gear 32 is located on a side opposite to the housing plate portion 122 with respect to the carrier main body 330 and the coil 22.

The pin 331 includes a connection portion 335 and a support portion 336. The connection portion 335 and the support portion 336 are each formed of, for example, metal in a columnar shape. The connection portion 335 and the support portion 336 are integrally formed such that their respective axes are shifted from each other and are parallel to each other. Therefore, the connection portion 335 and the support portion 336 have a crank-like cross-sectional shape along a virtual plane including their respective axes (see FIG. 1).

The pin 331 is fixed to the carrier main body 330 such that the connection portion 335, which is a portion on one end portion side, is connected to the carrier main body 330. Here, the support portion 336 is provided such that the axis of the support portion 336 is located on the radially outer side of the carrier main body 330 with respect to the axis of the connection portion 335 on a side of the carrier main body 330 opposite to the rotor 23 and the magnet 230 (see FIG. 1). A total of four pins 331 are provided corresponding to the number of planetary gears 32.

The speed reducer 30 includes a planetary gear bearing 36. The planetary gear bearing 36 is, for example, a needle bearing, and is provided between an outer peripheral wall of the support portion 336 of the pin 331 and an inner peripheral wall of the planetary gear 32. Accordingly, the planetary gear 32 is rotatably supported by the support portion 336 of the pin 331 via the planetary gear bearing 36.

The first ring gear 34 includes a first ring gear tooth portion 341 that is a tooth portion that can mesh with the planetary gear 32, and is fixed to the housing 12. More specifically, the first ring gear 34 is formed of, for example, metal in a substantially annular shape. The first ring gear 34 is fixed to the housing 12 such that an outer edge portion is fitted to an inner peripheral wall of the housing outer cylinder portion 123 on a side opposite to the housing plate portion 122 with respect to the coil 22. Therefore, the first ring gear 34 is not rotatable relative to the housing 12.

Here, the first ring gear 34 is provided coaxially with the housing 12, the rotor 23, and the sun gear 31. The first ring gear tooth portion 341 as a "tooth portion" and "internal teeth" is formed in an inner edge portion of the first ring gear 34 to be able to mesh with one end portion side in the axial direction of the planetary gear tooth portion 321 of the planetary gear 32.

The second ring gear 35 includes a second ring gear tooth portion 351 that is a tooth portion that can mesh with the planetary gear 32 and has a different number of teeth from the first ring gear tooth portion 341, and is provided rotatably integrally with the drive cam 40 to be described later. More specifically, the second ring gear 35 is formed of, for example, metal in a substantially annular shape. The second ring gear 35 includes a gear inner cylinder portion 355, a gear plate portion 356, and a gear outer cylinder portion 357. The gear inner cylinder portion 355 is formed in a substantially cylindrical shape. The gear plate portion 356 is formed in an annular plate shape to extend to the radially outer side from one end of the gear inner cylinder portion 355. The gear outer cylinder portion 357 is formed in a substantially cylindrical shape to extend from an outer edge portion of the gear plate portion 356 to a side opposite to the gear inner cylinder portion 355.

Here, the second ring gear 35 is provided coaxially with the housing 12, the rotor 23, and the sun gear 31. The second ring gear tooth portion 351 as a "tooth portion" and "internal teeth" is formed on an inner peripheral wall of the gear outer cylinder portion 357 to be capable of meshing with the other end portion side in the axial direction of the planetary gear tooth portion 321 of the planetary gear 32. In the present embodiment, the number of teeth of the second ring gear tooth portion 351 is larger than the number of teeth of the first ring gear tooth portion 341. More specifically, the number of teeth of the second ring gear tooth portion 351 is larger than the number of teeth of the first ring gear tooth portion 341 by a number obtained by multiplying 4, which is the number of planetary gears 32, by an integer.

Since the planetary gear 32 is required to normally mesh with the first ring gear 34 and the second ring gear 35 having two different specifications at the same portion without interference, the planetary gear 32 is designed such that one or both of the first ring gear 34 and the second ring gear 35 are dislocated to keep a center distance of each gear pair constant.

With the above configuration, when the rotor 23 of the motor 20 rotates, the sun gear 31 rotates, and the planetary gear tooth portion 321 of the planetary gear 32 revolves in the circumferential direction of the sun gear 31 while meshing with the sun gear tooth portion 311, the first ring gear tooth portion 341, and the second ring gear tooth portion 351 and rotating on its axis. Here, since the number of teeth of the second ring gear tooth portion 351 is larger than the number of teeth of the first ring gear tooth portion 341, the second ring gear 35 rotates relative to the first ring gear 34. Therefore, between the first ring gear 34 and the second ring gear 35, a minute differential rotation corresponding to a difference in the number of teeth between the first ring gear tooth portion 341 and the second ring gear tooth portion 351 is output as a rotation of the second ring gear 35. Accordingly, a torque from the motor 20 is decelerated by the speed reducer 30 and output from the second ring gear 35. In this way, the speed reducer 30 can decelerate and output the torque of the motor 20. In the present embodiment, the speed reducer 30 constitutes a 3k-type strange planetary gear speed reducer.

The second ring gear 35 is separately formed from the drive cam 40 to be described later, and is provided rotatably integrally with the drive cam 40. The second ring gear 35 outputs the torque from the motor 20 at a reduced speed to the drive cam 40. Here, the second ring gear 35 corresponds to an "output unit" of the speed reducer 30.

The ball cam 2 includes the drive cam 40 as a "rotation portion", the driven cam 50 as a "translation portion", and balls 3 as a "rolling body".

The drive cam 40 includes a drive cam main body 41, a drive cam inner cylinder portion 42, a drive cam plate portion 43, a drive cam outer cylinder portion 44, a drive cam groove 400, and the like. The drive cam main body 41 is formed in a substantially annular plate shape. The drive cam inner cylinder portion 42 is formed in a substantially cylindrical shape to extend in the axial direction from an outer edge portion of the drive cam main body 41. The drive cam plate portion 43 is formed in a substantially annular plate shape to extend to the radially outer side from an end portion of the drive cam inner cylinder portion 42 on a side opposite to the drive cam main body 41. The drive cam outer cylinder portion 44 is formed in a substantially cylindrical shape to extend from an outer edge portion of the drive cam plate portion 43 to a side opposite to the drive cam inner cylinder portion 42. Here, the drive cam main body 41, the drive cam inner cylinder portion 42, the drive cam plate portion 43, and the drive cam outer cylinder portion 44 are integrally formed of, for example, metal.

The drive cam groove 400 is formed to be recessed from one end surface, which is a surface of the drive cam main body 41 on a drive cam inner cylinder portion 42 side, toward the other end surface. The drive cam groove 400 is formed such that a depth from the one end surface changes in a circumferential direction of the drive cam main body 41. For example, three drive cam grooves 400 are formed at equal intervals in the circumferential direction of the drive cam main body 41.

The drive cam 40 is provided between the housing inner cylinder portion 121 and the housing outer cylinder portion 123 such that the drive cam main body 41 is located between the outer peripheral wall of the housing inner cylinder portion 121 and an inner peripheral wall of the sun gear 31, and the drive cam plate portion 43 is located on a side opposite to the carrier main body 330 with respect to the planetary gear 32. The drive cam 40 is rotatable relative to the housing 12.

The second ring gear 35 is provided integrally with the drive cam 40 such that an inner peripheral wall of the gear inner cylinder portion 355 is fitted to an outer peripheral wall of the drive cam outer cylinder portion 44. The second ring gear 35 is not rotatable relative to the drive cam 40. That is, the second ring gear 35 is provided to be integrally rotatable with the drive cam 40 as a "rotation portion". Therefore, when the torque from the motor 20 is decelerated by the speed reducer 30 and output from the second ring gear 35, the drive cam 40 rotates relative to the housing 12. That is, when the torque output from the speed reducer 30 is input to the drive cam 40, the drive cam 40 rotates relative to the housing 12.

The driven cam 50 includes a driven cam main body 51, a driven cam cylinder portion 52, cam-side spline groove portions 54, driven cam grooves 500, and the like. The driven cam main body 51 is formed in a substantially annular plate shape. The driven cam cylinder portion 52 is formed in a substantially cylindrical shape to extend in the axial direction from an outer edge portion of the driven cam main body 51. Here, the driven cam main body 51 and the driven cam cylinder portion 52 are integrally formed of, for example, metal.

The cam-side spline groove portions 54 are formed to extend in the axial direction on an inner peripheral wall of the driven cam main body 51. Multiple cam-side spline groove portions 54 are formed in a circumferential direction of the driven cam main body 51.

The driven cam 50 is provided such that the driven cam main body 51 is located on a side opposite to the housing step surface 125 with respect to the drive cam main body 41 and the radially inner side of the drive cam inner cylinder portion 42 and the drive cam plate portion 43, and the cam-side spline groove portions 54 are spline-coupled to the housing-side spline groove portions 127. Accordingly, the driven cam 50 is not rotatable relative to the housing 12 and is movable relative to the housing 12 in the axial direction.

The driven cam groove 500 is formed to be recessed from one end surface, which is a surface of the driven cam main body 51 on a drive cam main body 41 side, toward the other end surface. The driven cam groove 500 is formed such that a depth from the one end surface changes in the circumferential direction of the driven cam main body 51. For example, three driven cam grooves 500 are formed at equal intervals in the circumferential direction of the driven cam main body 51.

The drive cam groove 400 and the driven cam groove 500 are each formed to have the same shape when viewed from a surface side of the drive cam main body 41 on a driven cam main body 51 side or from a surface side of the driven cam main body 51 on the drive cam main body 41 side.

The balls 3 are formed of, for example, metal in a spherical shape. Balls 3 are provided to be rollable between the three drive cam grooves 400 and the three driven cam grooves 500. That is, three balls 3 are provided in total.

In this way, the drive cam 40, the driven cam 50, and the balls 3 constitute the ball cam 2 as a "rolling ball cam". When the drive cam 40 rotates relative to the housing 12 and the driven cam 50, the balls 3 roll along the respective groove bottoms in the drive cam grooves 400 and the driven cam grooves 500.

As shown in FIG. 1, the balls 3 are provided on the radially inner side of the first ring gear 34 and the second ring gear 35. More specifically, most of the balls 3 are provided within a range in the axial direction of the first ring gear 34 and the second ring gear 35.

As described above, the drive cam grooves 400 and the driven cam grooves 500 are formed such that the depth changes in the circumferential direction of the drive cam 40 or the driven cam 50. Therefore, when the drive cam 40 rotates relative to the housing 12 and the driven cam 50 due to the torque output from the speed reducer 30, the balls 3 roll in the drive cam grooves 400 and the driven cam grooves 500, and the driven cam 50 moves relative to the drive cam 40 and the housing 12 in the axial direction, that is, strokes.

In this way, the driven cam 50 includes multiple driven cam grooves 500 formed on the one end surface to sandwich the balls 3 between the driven cam grooves 500 and the drive cam grooves 400, and constitutes the ball cam 2 together with the drive cam 40 and the balls 3. When the drive cam 40 rotates relative to the housing 12, the driven cam 50 moves relative to the drive cam 40 and the housing 12 in the axial direction. Here, since the cam-side spline groove portions 54 are spline-coupled to the housing-side spline groove portions 127, the driven cam 50 does not rotate relative to the housing 12. In addition, the drive cam 40 rotates relative to the housing 12, but does not move relative to the housing 12 in the axial direction.

In the present embodiment, the clutch actuator 10 includes a return spring 55 as an "urging member", a return spring retainer 56, and a C ring 57. The return spring 55 is, for example, a coil spring, and is provided on the radially outer side of an end portion of the housing inner cylinder portion 121 on a side opposite to the housing small plate portion 124 on a side of the driven cam main body 51 opposite to the drive cam main body 41. One end of the return spring 55 is in contact with a surface of the driven cam main body 51 on a side opposite to the drive cam main body 41.

The return spring retainer 56 is formed of, for example, metal in a substantially annular shape, and is in contact with the other end of the return spring 55 at the radially outer side of the housing inner cylinder portion 121. The C ring 57 is fixed to the outer peripheral wall of the housing inner cylinder portion 121 to lock a surface of the inner edge portion of the return spring retainer 56 on a side opposite to the driven cam main body 51.

The return spring 55 has a force extending in the axial direction. Therefore, the driven cam 50 is urged to the drive cam main body 41 side by the return spring 55 in a state where the ball 3 is sandwiched between the driven cam 50 and the drive cam 40.

The output shaft 62 includes a shaft portion 621, a plate portion 622, a cylinder portion 623, and a friction plate 624 (see FIG. 2). The shaft portion 621 is formed in a substantially cylindrical shape. The plate portion 622 is formed integrally with the shaft portion 621 to extend in an annular plate shape from one end of the shaft portion 621 to the radially outer side. The cylinder portion 623 is formed integrally with the plate portion 622 to extend in a substantially cylindrical shape from an outer edge portion of the plate portion 622 to a side opposite to the shaft portion 621. The friction plate 624 is formed in a substantially annular plate shape, and is provided on an end surface of the plate portion 622 on a cylinder portion 623 side. Here, the friction plate 624 is not rotatable relative to the plate portion 622. A clutch space 620 is formed in an inside of the cylinder portion 623.

An end portion of the input shaft 61 passes through an inside of the housing inner cylinder portion 121 and is located on a side opposite to the drive cam 40 with respect to the driven cam 50. The output shaft 62 is provided coaxially with the input shaft 61 on the side opposite to the drive cam 40 with respect to the driven cam 50. A ball bearing 142 is provided between an inner peripheral wall of the shaft portion 621 and an outer peripheral wall of the end portion of the input shaft 61. Accordingly, the output shaft 62 is bearing-supported by the input shaft 61 via the ball bearing 142. The input shaft 61 and the output shaft 62 are rotatable relative to the housing 12.

The clutch 70 is provided between the input shaft 61 and the output shaft 62 in the clutch space 620. The clutch 70 includes inner friction plates 71, outer friction plates 72, and a locking portion 701. Multiple inner friction plates 71 are each formed in a substantially annular plate shape, and are aligned in the axial direction between the input shaft 61 and the cylinder portion 623 of the output shaft 62. The inner friction plate 71 is provided such that an inner edge portion is spline-coupled to the outer peripheral wall of the input shaft 61. Therefore, the inner friction plates 71 are not rotatable relative to the input shaft 61 and are movable relative to the input shaft 61 in the axial direction.

Multiple outer friction plates 72 are each formed in a substantially annular plate shape, and are aligned in the axial direction between the input shaft 61 and the cylinder portion 623 of the output shaft 62. Here, the inner friction plates 71 and the outer friction plates 72 are alternately arranged in the axial direction of the input shaft 61. An outer edge portion of the outer friction plate 72 is spline-coupled to an inner peripheral wall of the cylinder portion 623 of the output shaft 62. Therefore, the outer friction plate 72 is not rotatable relative to the output shaft 62 and is movable relative to the output shaft 62 in the axial direction. Among the multiple outer friction plates 72, the outer friction plate 72 located closest to a friction plate 624 side can come into contact with the friction plate 624.

The locking portion 701 is formed in a substantially annular shape, and is provided such that an outer edge portion is fitted to the inner peripheral wall of the cylinder portion 623 of the output shaft 62. The locking portion 701 is capable of locking an outer edge portion of the outer friction plate 72 located closest to the driven cam 50 among the multiple outer friction plates 72. Therefore, the multiple outer friction plates 72 and the multiple inner friction plates 71 are prevented from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state where the multiple inner friction plates 71 and the multiple outer friction plates 72 come into contact with each other, that is, are engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a non-engaged state where the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted.

When the clutch 70 is in the engaged state, a torque input to the input shaft 61 is transmitted to the output shaft 62 via the clutch 70. On the other hand, when the clutch 70 is in the non-engaged state, the torque input to the input shaft 61 is not transmitted to the output shaft 62.

In this way, the clutch 70 transmits the torque between the input shaft 61 and the output shaft 62. The clutch 70 permits torque transmission between the input shaft 61 and the output shaft 62 during the engaged state where the clutch 70 is engaged, and blocks the torque transmission between the input shaft 61 and the output shaft 62 during the non-engaged state where the clutch 70 is not engaged.

In the present embodiment, the clutch device 1 is a so-called normally open type clutch device that is normally in the non-engaged state.

The state changing unit 80 includes a disk spring 81 serving as an "elastic deformation portion", a disk spring retainer 82, and a thrust bearing 83. The disk spring retainer 82 includes a retainer cylinder portion 821 and a retainer flange portion 822. The retainer cylinder portion 821 is formed in a substantially cylindrical shape. The retainer flange portion 822 is formed in an annular plate shape to extend from one end of the retainer cylinder portion 821 to the radially outer side. The retainer cylinder portion 821 and the retainer flange portion 822 are integrally formed of, for example, metal. The disk spring retainer 82 is fixed to the driven cam 50 such that an outer peripheral wall of the other end of the retainer cylinder portion 821 is fitted to an inner peripheral wall of the driven cam cylinder portion 52.

The disk spring 81 is provided such that an inner edge portion is located between the driven cam cylinder portion 52 and the retainer flange portion 822 on the radially outer side of the retainer cylinder portion 821. The thrust bearing 83 is provided between the driven cam cylinder portion 52 and the disk spring 81.

The disk spring retainer 82 is fixed to the driven cam 50 such that the retainer flange portion 822 can lock one end of the disk spring 81 in the axial direction, that is, the inner edge portion. Therefore, the disk spring 81 and the thrust bearing 83 are prevented from coming off from the disk spring retainer 82 by the retainer flange portion 822. The disk spring 81 is elastically deformable in the axial direction.

As shown in FIGS. 1, and 2, when the ball 3 is located at a position (origin) corresponding to a deepest portion which is a portion farthest from the one end surface of the drive cam groove 400 in the axial direction of the drive cam main body 41, that is, in a depth direction, and at a position (origin) corresponding to a deepest portion which is a portion farthest from the one end surface of the driven cam groove 500 in the axial direction of the driven cam main body 51, that is, in the depth direction, a distance between the drive cam 40 and the driven cam 50 is relatively small, and a gap Sp1 is formed between the clutch 70 and the other end of the disk spring 81 in the axial direction, that is, an outer edge portion (see FIG. 1). Therefore, the clutch 70 is in the non-engaged state, and the torque transmission between the input shaft 61 and the output shaft 62 is blocked.

Here, when electric power is supplied to the coil 22 of the motor 20 under control of the ECU 100 during normal operation for changing the state of the clutch 70, the motor 20 rotates, the torque is output from the speed reducer 30, and the drive cam 40 rotates relative to the housing 12. Accordingly, the ball 3 rolls from the position corresponding to the deepest portion to one side in the circumferential direction of the drive cam groove 400 and the driven cam groove 500. Accordingly, the driven cam 50 moves relative to the housing 12 in the axial direction, that is, moves toward the clutch 70 while compressing the return spring 55. Accordingly, the disk spring 81 moves toward the clutch 70.

When the disk spring 81 moves toward the clutch 70 due to the movement of the driven cam 50 in the axial direction, the gap Sp1 decreases, and the other end of the disk spring 81 in the axial direction comes into contact with the outer friction plate 72 of the clutch 70. When the driven cam 50 further moves in the axial direction after the disk spring 81 comes into contact with the clutch 70, the disk spring 81 presses the outer friction plate 72 toward the friction plate 624 while being elastically deformed in the axial direction. Accordingly, the multiple inner friction plates 71 and the multiple outer friction plates 72 are engaged with each other, and the clutch 70 is in the engaged state. Therefore, the torque transmission between the input shaft 61 and the output shaft 62 is permitted.

At this time, the disk spring 81 rotates relative to the driven cam 50 and the disk spring retainer 82 while being bearing-supported by the thrust bearing 83. In this way, the thrust bearing 83 bearing-supports the disk spring 81 while receiving a load in a thrust direction from the disk spring 81.

When a clutch transmission torque reaches a clutch required torque capacity, the ECU 100 stops the rotation of the motor 20. Accordingly, the clutch 70 is in an engagement maintaining state where the clutch transmission torque is maintained at the clutch required torque capacity. In this way, the disk spring 81 of the state changing unit 80 can receive a force in the axial direction from the driven cam 50, and can change the state of the clutch 70 to the engaged state or the non-engaged state according to the relative position of the driven cam 50 in the axial direction with respect to the housing 12 and the drive cam 40.

An end portion of the shaft portion 621 on a side opposite to the plate portion 622 is connected to an input shaft of a transmission (not shown), and the output shaft 62 is rotatable together with the input shaft. That is, the torque output from the output shaft 62 is input to the input shaft of the transmission. The torque input to the transmission is changed in speed by the transmission, and is output to a drive wheel of the vehicle as a drive torque. Accordingly, the vehicle travels.

Next, the 3k-type strange planetary gear speed reducer employed by the speed reducer 30 according to the present embodiment will be described.

In an electric clutch device as in the present embodiment, it is required to shorten a time required for an initial response to reduce an initial gap (corresponding to the gap Sp1) between a clutch and an actuator. In order to speed up the initial response, it is understood from a rotational motion equation that an inertia moment around an input shaft is required to be reduced. The inertia moment when the input shaft is a solid cylindrical member increases in proportion to a fourth power of an outer diameter when a length and density are constant. In the clutch device 1 according to the present embodiment, the sun gear 31 corresponding to the "input shaft" here is a hollow cylindrical member, and this tendency does not change.

Figure 3:
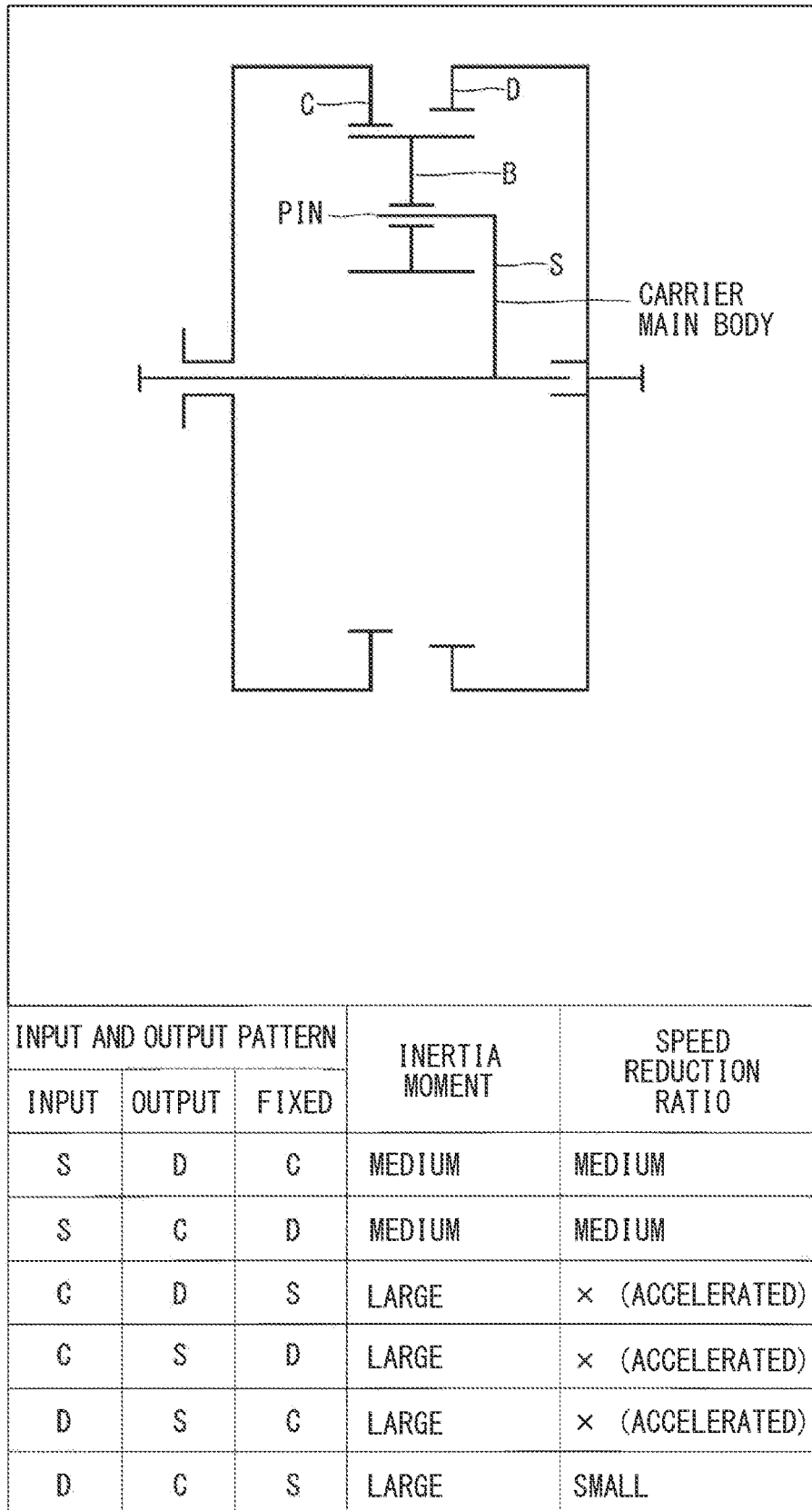
FIG. 3 is a schematic diagram of a 2kh-type strange planetary gear speed reducer, and a table showing a relationship among an input and output pattern, an inertia moment, and a speed reduction ratio.
Figure 4:
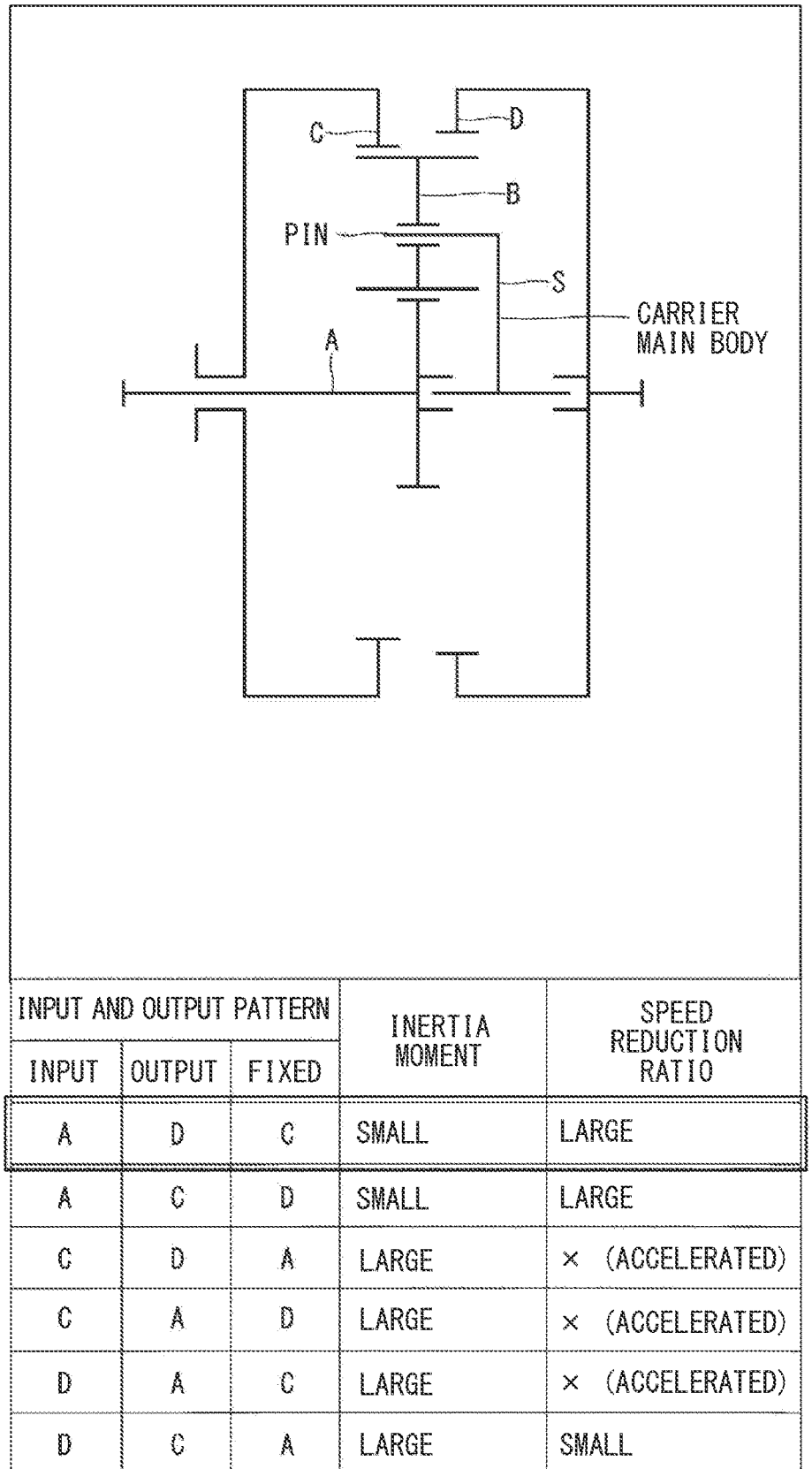
FIG. 4 is a schematic diagram of a 3k-type strange planetary gear speed reducer, and a table showing a relationship among an input and output pattern, an inertia moment, and a speed reduction ratio.

An upper part of FIG. 3 shows a schematic diagram of a 2kh-type strange planetary gear speed reducer. In addition, an upper part of FIG. 4 shows a schematic diagram of the 3k-type strange planetary gear speed reducer. Here, the sun gear is referred to as A, the planetary gear is referred to as B, the first ring gear is referred to as C, the second ring gear is referred to as D, and the carrier is referred to as S. Comparing the 2kh-type and the 3k-type, the 3k-type has a configuration in which the sun gear A is added to the 2kh-type.

In the case of the 2kh-type, when the carrier S located on a most radially inner side among the components is used as an input element, the inertia moment around the input shaft is the smallest (see a table in a lower part of FIG. 3).

On the other hand, in the case of the 3k-type, when the sun gear A located on a most radially inner side among the components is used as an input element, the inertia moment around the input shaft is the smallest (see a table in a lower part of FIG. 4).

A magnitude of the inertia moment is larger in the case of the 2kh-type strange planetary gear speed reducer using the carrier S as an input element than in the case of the 3k-type strange planetary gear speed reducer using the sun gear A as an input element. Therefore, in an electric clutch device in which a speed of the initial response is required, when a strange planetary gear speed reducer is employed as the speed reducer, it is desirable that the 3k-type is used and the sun gear A is used as an input element.

In the electric clutch device, the required load is very large from several thousand to ten thousand N, and in order to achieve both a high response and a high load, it is necessary to increase a speed reduction ratio of the speed reducer. Comparing maximum speed reduction ratios of the same gear specifications of the 2kh-type and the 3k-type, the maximum speed reduction ratio of the 3k-type is about 2 times the maximum speed reduction ratio of the 2kh-type, which is large. In addition, in the case of the 3k-type, when the sun gear A having a smallest inertia moment is used as an input element, a large speed reduction ratio can be obtained (see the table in the lower part of FIG. 4). Therefore, it can be said that an optimal configuration for achieving both the high response and the high load is a configuration in which the 3k-type is used and the sun gear A is used as an input element.

In the present embodiment, the speed reducer 30 is a 3k-type strange planetary gear speed reducer in which the sun gear 31(A) is used as an input element, the second ring gear 35(D) is used as an output element, and the first ring gear 34(C) is used as a fixed element. Therefore, an inertia moment around the sun gear 31 can be reduced, and a speed reduction ratio of the speed reducer 30 can be increased. Therefore, both the high response and the high load in the clutch actuator 10 of the clutch device 1 can be achieved.

In the case of the 2kh-type, since the carrier S directly contributes to power transmission, in a configuration in which the planetary gear B is supported in a cantilever manner on a main body of the carrier S by a pin, there is a concern that a large bending moment may act between a rotation support shaft (pin) of the planetary gear B and the main body of the carrier S (see the schematic diagram in the upper part of FIG. 3).

On the other hand, in the case of the 3k-type, since the carrier S has only a function of holding the planetary gear B at an appropriate position with respect to the sun gear A, the first ring gear C, and the second ring gear D, the bending moment acting between the rotation support shaft (pin) of the planetary gear B and the main body of the carrier S is small (see the schematic diagram in the upper part of FIG. 4).

Therefore, in the present embodiment, by making the speed reducer 30 as a 3k-type strange planetary gear speed reducer have a high response and a high load, the planetary gear 32 can be supported from one side in the axial direction, that is, can be supported in a cantilever manner by the carrier main body 330 and the pin 331 without impairing responsiveness and durability of the clutch actuator 10 of the clutch device 1.

In the present embodiment, the clutch device 1 includes an oil supply portion 5 (see FIGS. 1 and 2). The oil supply portion 5 is formed in a passage shape in the output shaft 62 such that one end of the oil supply portion 5 is exposed to the clutch space 620. The other end of the oil supply portion 5 is connected to an oil supply source (not shown). Accordingly, oil is supplied from the one end of the oil supply portion 5 to the clutch 70 in the clutch space 620.

The ECU 100 controls an amount of oil to be supplied from the oil supply portion 5 to the clutch 70. The oil supplied to the clutch 70 is capable of lubricating and cooling the clutch 70. In this way, in the present embodiment, the clutch 70 is a wet clutch and can be cooled by oil.

In the present embodiment, the ball cam 2 as a "rotational translation unit" forms the accommodation space 120 between the drive cam 40 as a "rotation portion" and the housing 12, and between the second ring gear 35 and the housing 12. Here, the accommodation space 120 is formed inside the housing 12 on a side opposite to the clutch 70 with respect to the drive cam 40 and the second ring gear 35. The motor 20 and the speed reducer 30 are provided in the accommodation space 120. The clutch 70 is provided in the clutch space 620, which is a space on a side opposite to the accommodation space 120 with respect to the drive cam 40.

In the present embodiment, the clutch actuator 10 includes a thrust bearing 161 and a thrust bearing washer 162. The thrust bearing washer 162 is formed of, for example, metal in a substantially annular plate shape, and is provided such that one surface thereof is in contact with the housing step surface 125. The thrust bearing 161 is provided between the other surface of the thrust bearing washer 162 and a surface of the drive cam main body 41 on a side opposite to the driven cam 50. The thrust bearing 161 bearing-supports the drive cam 40 while receiving a load in the thrust direction from the drive cam 40. In the present embodiment, a load in the thrust direction acting on the drive cam 40 from the clutch 70 side via the driven cam 50 acts on the housing step surface 125 via the thrust bearing 161 and the thrust bearing washer 162. Therefore, the drive cam 40 can be stably bearing-supported by the housing step surface 125.

In the present embodiment, the clutch actuator 10 includes an inner sealing member 191 and an outer sealing member 192 as "seal members". The inner sealing member 191 and the outer sealing member 192 are oil seals annularly formed of an elastic material such as rubber and a metal ring.

An inner diameter and an outer diameter of the inner sealing member 191 are smaller than an inner diameter and an outer diameter of the outer sealing member 192.

The inner sealing member 191 is located between the housing inner cylinder portion 121 and the thrust bearing 161 in the radial direction, and is located between the thrust bearing washer 162 and the drive cam main body 41 in the axial direction. The inner sealing member 191 is fixed to the housing inner cylinder portion 121 and is rotatable relative to the drive cam 40.

The outer sealing member 192 is provided between the gear inner cylinder portion 355 of the second ring gear 35 and an end portion of the housing outer cylinder portion 123 on the clutch 70 side. The outer sealing member 192 is fixed to the housing outer cylinder portion 123 and is rotatable relative to the second ring gear 35.

Here, the outer sealing member 192 is provided to be located on the radially outer side of the inner sealing member 191 when viewed in the axial direction of the inner sealing member 191 (see FIGS. 1 and 2).

A surface of the drive cam main body 41 on a thrust bearing washer 162 side is slidable on a seal lip portion of the inner sealing member 191. That is, the inner sealing member 191 is provided to come into contact with the drive cam 40 as a "rotation portion". The inner sealing member 191 seals the drive cam main body 41 and the thrust bearing washer 162 in an airtight or liquid-tight manner.

An outer peripheral wall of the gear inner cylinder portion 355 of the second ring gear 35 is slidable on a seal lip portion, which is an inner edge portion of the outer sealing member 192. That is, the outer sealing member 192 is provided to come into contact with the second ring gear 35 that rotates integrally with the drive cam 40 on the radially outer side of the drive cam 40 as a "rotation portion". The outer sealing member 192 seals the outer peripheral wall of the gear inner cylinder portion 355 and the inner peripheral wall of the housing outer cylinder portion 123 in an airtight or liquid-tight manner.

By the inner sealing member 191 and the outer sealing member 192 provided as described above, the accommodation space 120 in which the motor 20 and the speed reducer 30 are accommodated can be maintained in an airtight or liquid-tight manner, and the accommodation space 120 and the clutch space 620 in which the clutch 70 is provided can be maintained in an airtight or liquid-tight manner. Accordingly, for example, even if a foreign matter such as abrasion powder is generated in the clutch 70, the foreign matter can be reduced from entering the accommodation space 120 from the clutch space 620. Therefore, an operation failure of the motor 20 or the speed reducer 30 caused by the foreign matter can be reduced.

In the present embodiment, since the accommodation space 120 and the clutch space 620 are maintained in an airtight or liquid-tight manner by the inner sealing member 191 and the outer sealing member 192, even if the foreign matter such as the abrasion powder is contained in the oil supplied to the clutch 70, the oil containing the foreign matter can be restricted from flowing into the accommodation space 120 from the clutch space 620.

In the present embodiment, the housing 12 is formed to have a closed shape from a portion corresponding to the radially outer side of the outer sealing member 192 to a portion corresponding to the radially inner side of the inner sealing member 191 (see FIGS. 1 and 2).

In the present embodiment, although the drive cam 40 and the second ring gear 35 forming the accommodation space 120 with the housing 12 rotate relative to the housing 12, the drive cam 40 and the second ring gear 35 do not move relative to the housing 12 in the axial direction. Therefore, when the clutch device 1 is operated, a change in capacity of the accommodation space 120 can be reduced, and generation of a negative pressure in the accommodation space 120 can be reduced. Accordingly, the oil or the like containing the foreign matter can be restricted from being suctioned into the accommodation space 120 from the clutch space 620.

The inner sealing member 191 to come into contact with the inner edge portion of the drive cam 40 slides on the drive cam 40 in the circumferential direction, but does not slide in the axial direction. In addition, the outer sealing member 192 to come into contact with the outer peripheral wall of the gear inner cylinder portion 355 of the second ring gear 35 slides on the second ring gear 35 in the circumferential direction, but does not slide in the axial direction.

As shown in FIG. 1, the drive cam main body 41 is located on a side opposite to the clutch 70 with respect to the drive cam outer cylinder portion 44. That is, the drive cam 40 as a "rotation portion" is bent in the axial direction to be formed such that the drive cam main body 41, which is the inner edge portion of the drive cam 40, and the drive cam outer cylinder portion 44, which is an outer edge portion of the drive cam 40, are located at different positions in the axial direction.

The driven cam main body 51 is provided to be located on the radially inner side of the drive cam inner cylinder portion 42 in the clutch 70 side of the drive cam main body 41. That is, the drive cam 40 and the driven cam 50 are provided in a nested manner in the axial direction.

More specifically, the driven cam main body 51 is located on the radially inner side of the gear plate portion 356, the gear outer cylinder portion 357 of the second ring gear 35, the drive cam plate portion 43, and the drive cam inner cylinder portion 42. In addition, the sun gear tooth portion 311 of the sun gear 31, the carrier 33, and the planetary gears 32 are located on the radially outer side of the drive cam main body 41 and the driven cam main body 51. Accordingly, a size of the clutch device 1 in the axial direction including the speed reducer 30 and the ball cam 2 can be significantly reduced.

In the present embodiment, as shown in FIG. 1, the drive cam main body 41, the sun gear 31, the carrier 33, and the coil 22 are arranged to partially overlap with each other in an axial direction of the drive cam main body 41. In other words, a part of the coil 22 is provided to be located on the radially outer side of a part of the drive cam main body 41, the sun gear 31, and the carrier 33 in the axial direction. Accordingly, the size of the clutch device 1 in the axial direction can be further reduced.

Hereinafter, the configuration of each portion of the present embodiment will be described in more detail.

The drive cam 40 as a "rotation portion" and the second ring gear 35 as an "output unit" are separately formed of different materials, and the drive cam 40 is provided to be rotatable integrally with the second ring gear 35.

The second ring gear 35 as an "output unit" and the drive cam 40 as a "rotation portion" are formed of materials having different strengths according to required strengths. Here, the term "strength" means, for example, hardness, yield strength, tensile strength, ductility, fracture energy (toughness), and bending strength (transverse rupture strength). In the present embodiment, the material forming the second ring gear 35 and the material forming the drive cam 40 are different in hardness, which is an indicator of the strength.

More specifically, since the drive cam 40 includes the drive cam groove 400 in which the balls 3 roll and a relatively large load acts thereon, the required surface hardness is high, and the drive cam 40 is formed of a high-strength material such as SCr material or S45C material.

On the other hand, the second ring gear 35, which does not require such a high hardness, is formed of a medium-strength material such as SPCC or SPHC.

The drive cam 40 and the second ring gear 35 are each formed by, for example, forging, pressing, sintering, or the like.

The drive cam 40 as a "rotation portion" is thermally treated. Accordingly, the strength of the drive cam 40 can be further increased. In this way, a method for manufacturing the clutch actuator 10 according to the present embodiment includes a thermal treatment step of thermally treating the drive cam 40.

As described above, in the present embodiment, the speed reducer 30 includes the second ring gear 35 as an "output unit" that outputs the decelerated torque of the motor 20 to the drive cam 40 as a "rotation portion". The drive cam 40 is formed of a material different from that of the second ring gear 35 separately, and is provided to be rotatable integrally with the second ring gear 35. Therefore, it is possible to easily set a variation of the speed reducer 30 that shares the drive cam 40, which is relatively difficult to manufacture. In addition, by separately forming the second ring gear 35 and the drive cam 40, moldability is improved, and manufacturing easiness and cost reduction can be achieved by adopting optimum materials and optimum machining methods of the second ring gear 35 and the drive cam 40.

In the present embodiment, the second ring gear 35 as an "output unit" and the drive cam 40 as a "rotation portion" are formed of materials having different strengths according to the required strengths. Therefore, workability can be improved and a cost can be reduced while ensuring the required strengths of the members.

In the present embodiment, the drive cam 40 as a "rotation portion" is formed of a material having a higher strength than that of the second ring gear 35 as an "output unit". Accordingly, the workability can be improved and the cost can be reduced while sufficiently ensuring the strength of the drive cam 40.

In the present embodiment, the drive cam 40 as a "rotation portion" is thermally treated. Therefore, the strength of the drive cam 40 can be further increased.

In the present embodiment, since the drive cam 40 and the second ring gear 35 are separately formed of different materials, only the drive cam 40 can be thermally treated without thermally treating the second ring gear 35. Therefore, it is possible to avoid distortion of the second ring gear 35 caused by thermally treating the drive cam 40 and the second ring gear 35 when the drive cam 40 and the second ring gear 35 are integrally formed of the same material.

In the present embodiment, the speed reducer 30 is a strange planetary gear speed reducer. Accordingly, the clutch actuator 10 can be flattened, and the mountability can be improved.

When a strange planetary gear speed reducer is employed as the speed reducer 30, a formation direction of the internal teeth of the second ring gear 35 as an "output unit" is opposite to a formation direction of the drive cam groove 400 of the drive cam 40 as a "rotation portion". In the present embodiment, since the second ring gear 35 and the drive cam 40 are separately formed of different materials, the internal teeth of the second ring gear 35 and the drive cam groove 400 can be easily formed. Therefore, manufacturing is easier than in the case where the second ring gear 35 and the drive cam 40 are integrally formed of the same material.

In the present embodiment, the speed reducer 30 includes the sun gear 31, the planetary gears 32, the carrier 33, the first ring gear 34, and the second ring gear 35. The torque from the motor 20 is input to the sun gear. The planetary gear 32 can revolve in a circumferential direction of the sun gear 31 while meshing with the sun gear 31 and rotating on its axis.

The carrier 33 rotatably supports the planetary gears 32 and is rotatable relative to the sun gear 31. The first ring gear 34 can mesh with the planetary gear 32. The second ring gear 35 can mesh with the planetary gear 32, is formed such that the number of the teeth of the tooth portion is different from that of the first ring gear 34, and outputs the torque to the drive cam 40 as a "rotation portion". The "output unit" corresponds to the second ring gear 35.

The present embodiment shows a specific example in which a strange planetary gear speed reducer is employed as the speed reducer 30.

Second Embodiment

Figure 5:
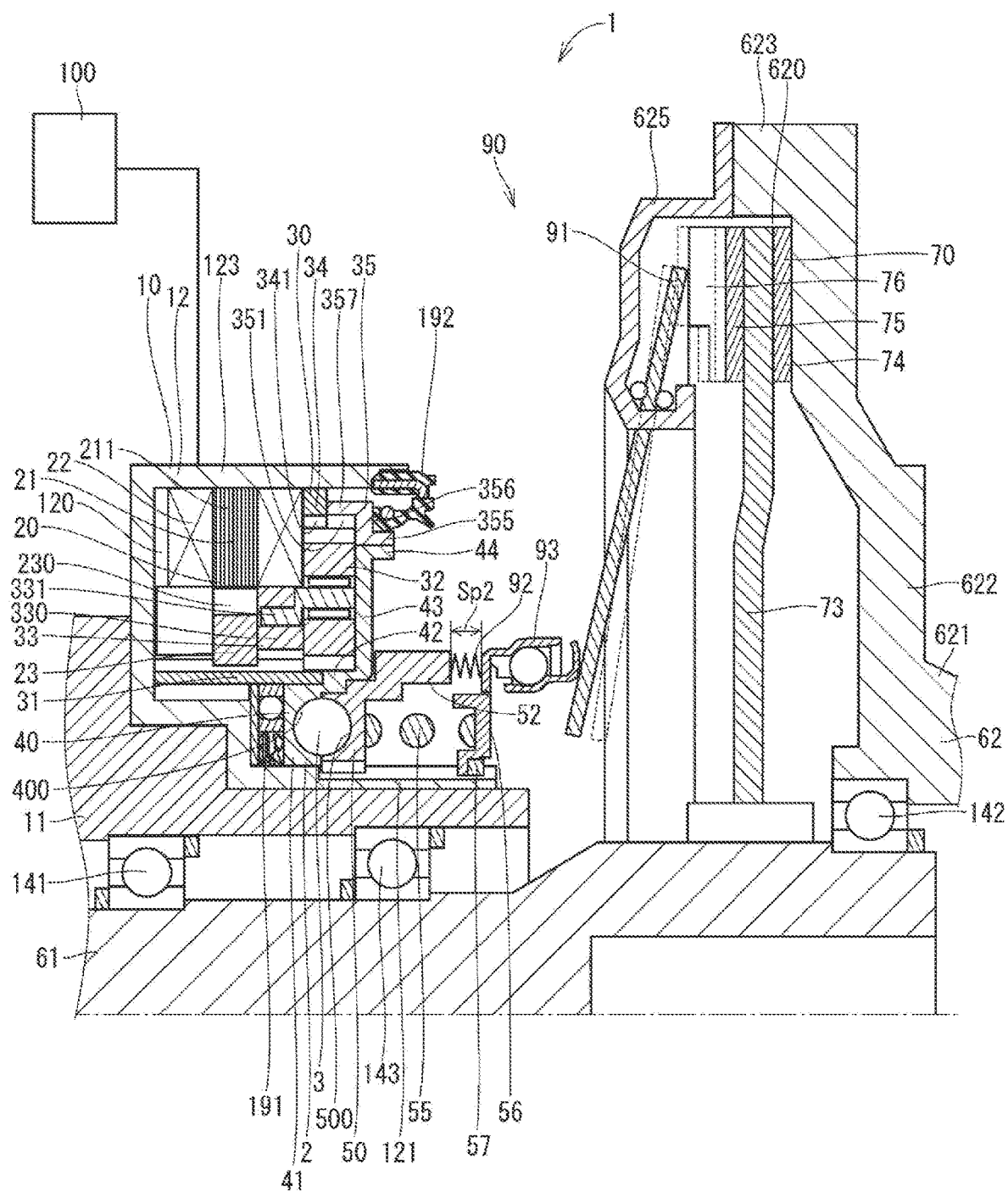
FIG. 5 is a cross-sectional view showing a part of a clutch actuator according to a second embodiment and a clutch device.

FIG. 5 shows a clutch device to which a clutch actuator according to a second embodiment is applied. The second embodiment is different from the first embodiment in configurations of a clutch and a state changing unit, and the like.

In the present embodiment, ball bearings 141 and 143 are provided between the inner peripheral wall of the fixed body 11 and the outer peripheral wall of the input shaft 61. Accordingly, the input shaft 61 is bearing-supported by the fixed body 11 via the ball bearings 141 and 143.

The housing 12 is fixed to the fixed body 11 such that a part of an outer wall is in contact with a wall surface of the fixed body 11. For example, the housing 12 is fixed to the fixed body 11 such that a surface of the housing small plate portion 124 on a side opposite to the ball 3, the inner peripheral wall of the housing inner cylinder portion 121, and an inner peripheral wall of the housing small inner cylinder portion 126 is in contact with an outer wall of the fixed body 11. The housing 12 is fixed to the fixed body 11 by bolts (not shown) or the like. Here, the housing 12 is provided coaxially with the fixed body 11 and the input shaft 61.

An arrangement of the motor 20, the speed reducer 30, the ball cam 2, and the like with respect to the housing 12 is the same as that of the first embodiment.

In the present embodiment, the output shaft 62 includes the shaft portion 621, the plate portion 622, the cylinder portion 623, and a cover 625. The shaft portion 621 is formed in a substantially cylindrical shape. The plate portion 622 is formed integrally with the shaft portion 621 to extend in an annular plate shape from one end of the shaft portion 621 to the radially outer side. The cylinder portion 623 is formed integrally with the plate portion 622 to extend in a substantially cylindrical shape from an outer edge portion of the plate portion 622 to a side opposite to the shaft portion 621. The output shaft 62 is bearing-supported by the input shaft 61 via the ball bearing 142. The clutch space 620 is formed in the inside of the cylinder portion 623.

The clutch 70 is provided between the input shaft 61 and the output shaft 62 in the clutch space 620. The clutch 70 includes a support portion 73, a friction plate 74, a friction plate 75, and a pressure plate 76. The support portion 73 is formed in a substantially annular plate shape to extend from an outer peripheral wall of an end portion of the input shaft 61 to the radially outer side on a driven cam 50 side with respect to the plate portion 622 of the output shaft 62.

The friction plate 74 is formed in a substantially annular plate shape, and is provided on a plate portion 622 side of the output shaft 62 on an outer edge portion of the support portion 73. The friction plate 74 is fixed to the support portion 73. The friction plate 74 can come into contact with the plate portion 622 by deforming the outer edge portion of the support portion 73 toward the plate portion 622.

The friction plate 75 is formed in a substantially annular plate shape, and is provided on a side opposite to the plate portion 622 of the output shaft 62 on the outer edge portion of the support portion 73. The friction plate 75 is fixed to the support portion 73.

The pressure plate 76 is formed in a substantially annular plate shape, and is provided on the driven cam 50 side with respect to the friction plate 75.

In an engaged state in which the friction plate 74 and the plate portion 622 come into contact with each other, that is, are engaged with each other, a frictional force is generated between the friction plate 74 and the plate portion 622, and relative rotation between the friction plate 74 and the plate portion 622 is restricted according to a magnitude of the frictional force. On the other hand, in a non-engaged state in which the friction plate 74 and the plate portion 622 are separated from each other, that is, are not engaged with each other, no frictional force is generated between the friction plate 74 and the plate portion 622, and the relative rotation between the friction plate 74 and the plate portion 622 is not restricted.

When the clutch 70 is in the engaged state, a torque input to the input shaft 61 is transmitted to the output shaft 62 via the clutch 70. On the other hand, when the clutch 70 is in the non-engaged state, the torque input to the input shaft 61 is not transmitted to the output shaft 62.

The cover 625 is formed in a substantially annular shape, and is provided on the cylinder portion 623 of the output shaft 62 to cover the pressure plate 76 from a side opposite to the friction plate 75.

In the present embodiment, the clutch actuator 10 of the clutch device 1 includes a state changing unit 90 instead of the state changing unit 80 shown in the first embodiment. The state changing unit 90 includes a diaphragm spring 91 as an "elastic deformation portion", a return spring 92, a release bearing 93, and the like.

The diaphragm spring 91 is formed in a substantially annular disk spring shape, and is provided on the cover 625 such that one end in an axial direction, that is, an outer edge portion is in contact with the pressure plate 76. Here, the diaphragm spring 91 is formed such that the outer edge portion is located on a clutch 70 side with respect to an inner edge portion, and a portion between the inner edge portion and the outer edge portion is supported by the cover 625. The diaphragm spring 91 is elastically deformable in the axial direction. Accordingly, the diaphragm spring 91 urges the pressure plate 76 toward the friction plate 75 by the one end in the axial direction, that is, the outer edge portion. Accordingly, the pressure plate 76 is pressed against the friction plate 75, and the friction plate 74 is pressed against the plate portion 622. That is, the clutch 70 is normally in the engaged state.

In the present embodiment, the clutch device 1 is a so-called normally closed-type clutch device that is normally in the engaged state.

The return spring 92 is, for example, a coil spring, and is provided such that one end is in contact with an end surface of the driven cam cylinder portion 52 on the clutch 70 side.

The release bearing 93 is provided between the other end of the return spring 92 and the inner edge portion of the diaphragm spring 91. The return spring 92 urges the release bearing 93 toward the diaphragm spring 91. The release bearing 93 bearing-supports the diaphragm spring 91 while receiving a load in a thrust direction from the diaphragm spring 91. An urging force of the return spring 92 is smaller than an urging force of the diaphragm spring 91.

As shown in FIG. 5, when the ball 3 is located at a position (origin) corresponding to a deepest portion of the drive cam groove 400 and the driven cam groove 500, a distance between the drive cam 40 and the driven cam 50 is relatively small, and a gap Sp2 is formed between the release bearing 93 and the driven cam step surface 53 of the driven cam 50. Therefore, the friction plate 74 is pressed against the plate portion 622 by the urging force of the diaphragm spring 91, the clutch 70 is in the engaged state, and torque transmission between the input shaft 61 and the output shaft 62 is permitted.

Here, when the electric power is supplied to the coil 22 of the motor 20 under the control of the ECU 100, the motor 20 rotates, the torque is output from the speed reducer 30, and the drive cam 40 rotates relative to the housing 12. Accordingly, the ball 3 rolls from the position corresponding to the deepest portion to one side in the circumferential direction of the drive cam groove 400 and the driven cam groove 500. Accordingly, the driven cam 50 moves relative to the housing 12 and the drive cam 40 in the axial direction, that is, moves toward the clutch 70. Accordingly, the gap Sp2 between the release bearing 93 and the end surface of the driven cam cylinder portion 52 is reduced, and the return spring 92 is compressed in the axial direction between the driven cam 50 and the release bearing 93.

When the driven cam 50 further moves toward the clutch 70, the return spring 92 is maximally compressed, and the release bearing 93 is pressed toward the clutch 70 by the driven cam 50. Accordingly, the release bearing 93 moves toward the clutch 70 against a reaction force from the diaphragm spring 91 while pressing the inner edge portion of the diaphragm spring 91.

When the release bearing 93 moves toward the clutch 70 while pressing the inner edge portion of the diaphragm spring 91, the inner edge portion of the diaphragm spring 91 moves toward the clutch 70, and the outer edge portion of the diaphragm spring 91 moves toward a side opposite to the clutch 70. Accordingly, the friction plate 74 is separated from the plate portion 622, and a state of the clutch 70 is changed from the engaged state to the non-engaged state. As a result, the torque transmission between the input shaft 61 and the output shaft 62 is blocked.

When a clutch transmission torque is 0, the ECU 100 stops the rotation of the motor 20. Accordingly, the state of the clutch 70 is maintained in the non-engaged state. In this way, the diaphragm spring 91 of the state changing unit 90 can receive a force in the axial direction from the driven cam 50 and change the state of the clutch 70 to the engaged state or the non-engaged state according to a relative position of the driven cam 50 in the axial direction with respect to the drive cam 40.

In the present embodiment, the clutch device 1 does not include the oil supply portion 5 shown in the first embodiment. That is, in the present embodiment, the clutch 70 is a dry clutch.

In this way, the present disclosure is also applicable to a normally closed-type clutch device including a dry clutch.

Third Embodiment

Figure 6:
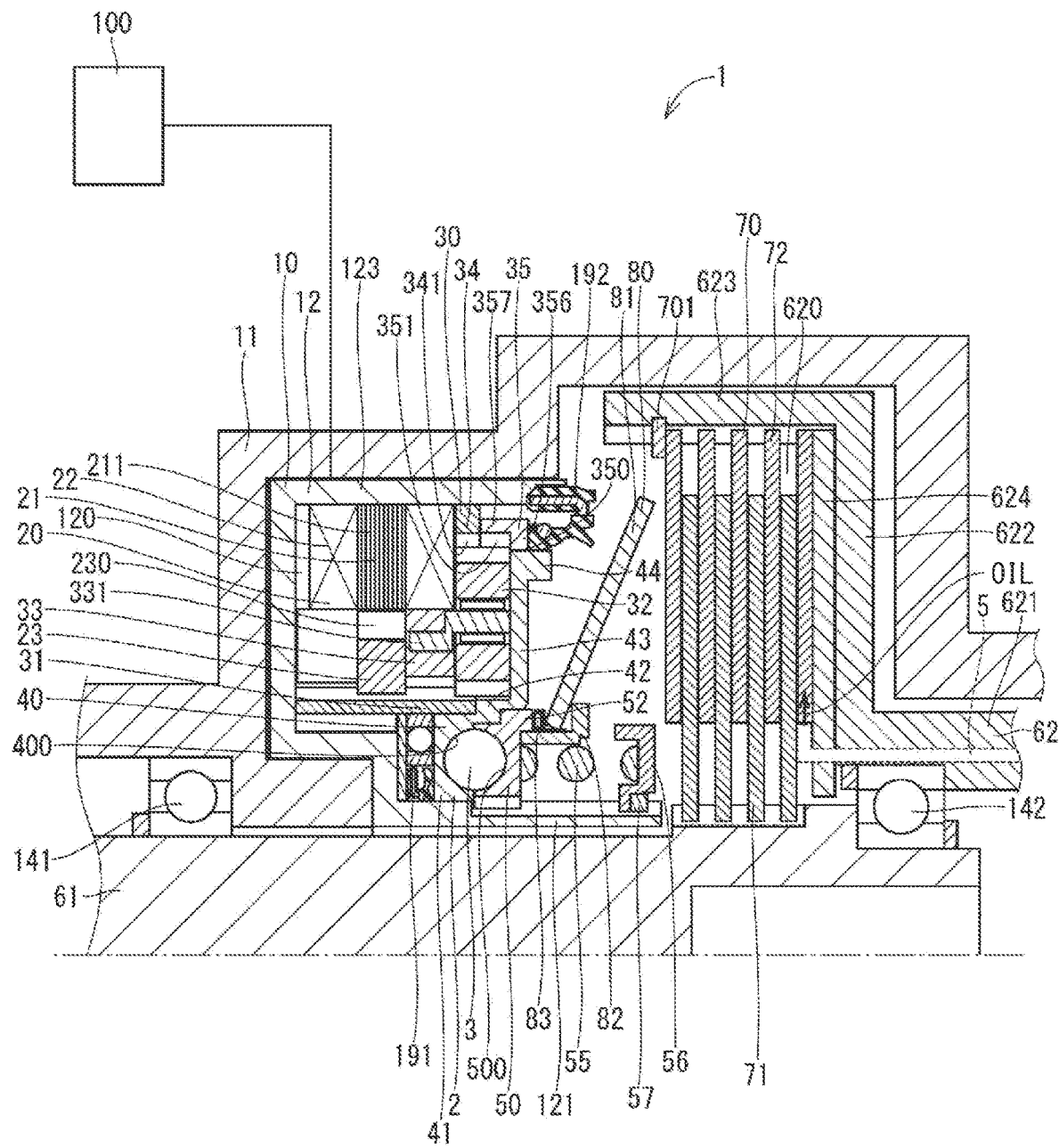
FIG. 6 is a cross-sectional view showing a part of a clutch actuator according to a third embodiment and a clutch device.

FIG. 6 shows a clutch device to which a clutch actuator according to a third embodiment is applied. The third embodiment is different from the first embodiment in a configuration of the second ring gear 35 and the like.

In the present embodiment, the second ring gear 35 as an "output unit" does not include the gear inner cylinder portion 355 shown in the first embodiment.

The outer sealing member 192 is provided between the drive cam outer cylinder portion 44 of the drive cam 40 and an end portion of the housing outer cylinder portion 123 on the clutch 70 side. The outer sealing member 192 is fixed to the housing outer cylinder portion 123 and is rotatable relative to the drive cam 40 and the second ring gear 35.

The outer peripheral wall of the drive cam outer cylinder portion 44 of the drive cam 40 is slidable on a seal lip portion, which is the inner edge portion of the outer sealing member 192. A joint portion 350 between the drive cam 40 as a "rotation portion" and the second ring gear 35 as an "output unit", that is, an interface between an outer peripheral wall of the drive cam plate portion 43 of the drive cam 40 and an inner peripheral wall of the gear plate portion 356 of the second ring gear 35, is located on the side opposite to the clutch 70 with respect to the seal lip portion of the outer sealing member 192.

The outer sealing member 192 forms the accommodation space 120 as a "space" between the housing 12 and the drive cam 40, and can maintain the accommodation space 120 in an airtight or liquid-tight manner. The joint portion 350 between the drive cam 40 as a "rotation portion" and the second ring gear 35 as an "output unit" is located in the accommodation space 120.

As described above, the present embodiment further includes the outer sealing member 192 as a "seal member". The outer sealing member 192 can maintain the accommodation space 120 as a "space" formed between the housing 12 and the drive cam 40 as a "rotation portion" in an airtight or liquid-tight manner. The motor 20 is provided in the accommodation space 120. The joint portion 350 between the drive cam 40 as a "rotation portion" and the second ring gear 35 as an "output unit" is located in the accommodation space 120.

In the present embodiment, since oil is supplied into the clutch space 620, the clutch actuator 10 is placed in the oil or in an oil mist environment. In the present embodiment, since the drive cam 40 as a "rotation portion" and the second ring gear 35 as an "output unit" are separately formed of different materials, a gap may be formed in the joint portion 350 between the drive cam 40 and the second ring gear 35. In the present embodiment, the outer sealing member 192 is provided on the clutch 70 side with respect to the joint portion 350, and the joint portion 350 is disposed in the accommodation space 120 that is maintained in an airtight or liquid-tight manner. Accordingly, even if the seal member is not provided in the joint portion 350, the oil on the clutch space 620 side can be restricted, by the outer sealing member 192, from entering the accommodation space 120 via the joint portion 350. Therefore, the motor 20 provided in the accommodation space 120 can be protected from the oil.

Fourth Embodiment

Figure 7:
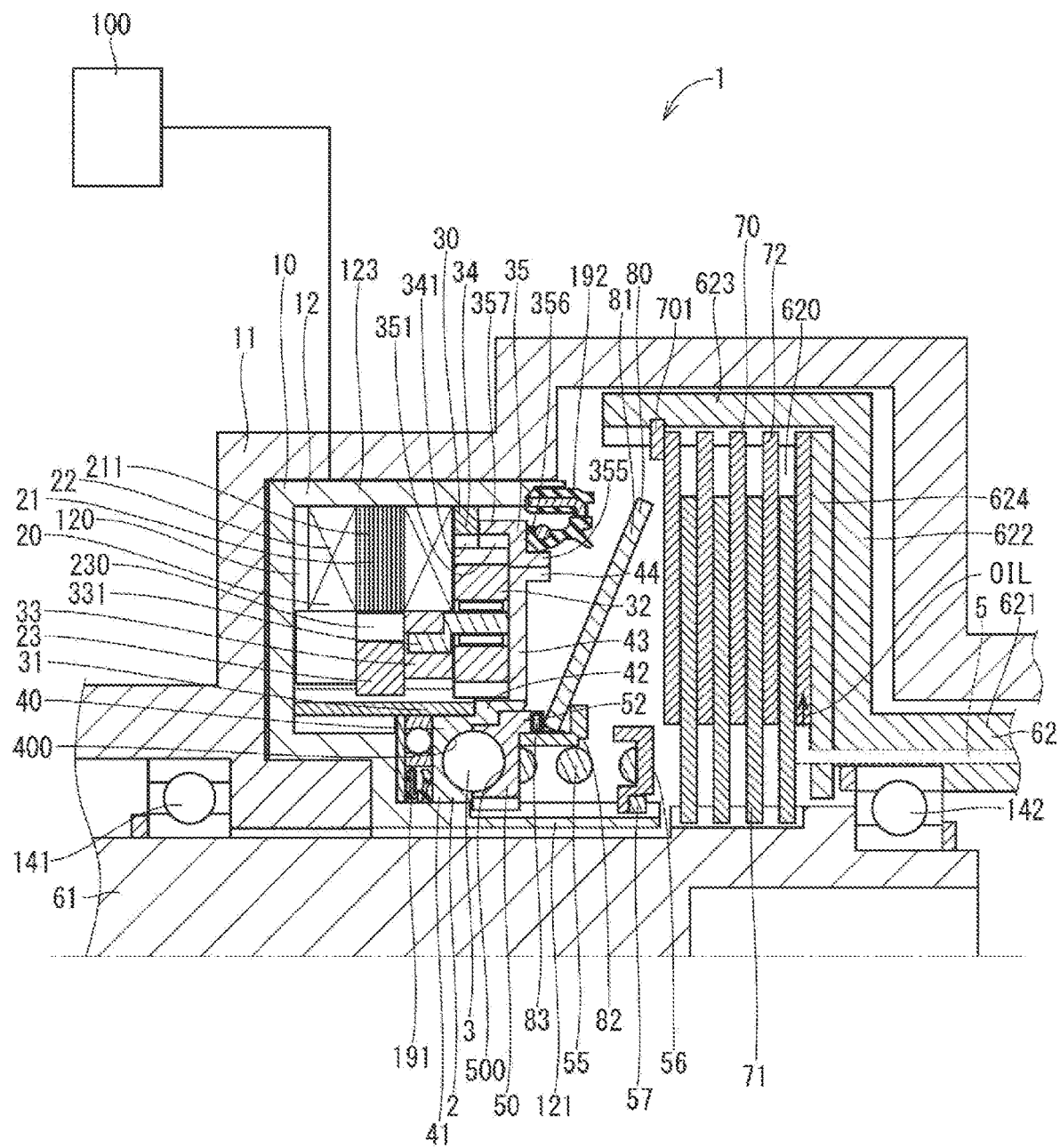
FIG. 7 is a cross-sectional view showing a part of a clutch actuator according to a fourth embodiment and a clutch device.

FIG. 7 shows a clutch device to which a clutch actuator according to a fourth embodiment is applied. The fourth embodiment is different from the first embodiment in a configuration of the drive cam 40 and the like.

In the present embodiment, the drive cam main body 41 and the drive cam inner cylinder portion 42, and the drive cam plate portion 43 and the drive cam outer cylinder portion 44 in the drive cam 40 are separately formed of different materials, and are provided to be integrally rotatable.

In the drive cam main body 41, the drive cam groove 400 is formed as a "portion" in which the ball 3 as a "rolling body" rolls. The drive cam plate portion 43 and the drive cam outer cylinder portion 44 couple the drive cam main body 41 and the drive cam inner cylinder portion 42 to the second ring gear 35 as an "output unit". Here, the drive cam main body 41 and the drive cam inner cylinder portion 42 correspond to a "cam portion". The drive cam plate portion 43 and the drive cam outer cylinder portion 44 correspond to a "coupling portion".

In the present embodiment, since the drive cam groove 400 is formed in the drive cam main body 41 and the drive cam inner cylinder portion 42 as a "cam portion", the required surface hardness is relatively high, and for example, the drive cam main body 41 and the drive cam inner cylinder portion 42 are formed of a high-strength material such as SCr material or S45C material.

On the other hand, since the drive cam plate portion 43 and the drive cam outer cylinder portion 44 as a "coupling portion" do not require such a high strength such as a high hardness, the drive cam plate portion 43 and the drive cam outer tube portion 44 are formed of a medium-strength material such as SPCC or SPHC.

As described above, in the present embodiment, the ball cam 2 as a "rotational translation unit" includes the balls 3 as "rolling bodies" that are rollably provided between the drive cam 40 as a "rotation portion" and the driven cam 50 as a "translation portion". The drive cam 40 as a "rotation portion" includes the drive cam main body 41 and the drive cam inner cylinder portion 42 as the "cam portion" in which the drive cam groove 400 as a "portion" in which the ball 3 rolls is formed, and the drive cam plate portion 43 and the drive cam outer cylinder portion 44 as a "coupling portion" that are formed of a material different from that of the "cam portion" separately and couple the "cam portion" and the second ring gear 35 as an "output unit".

Therefore, the "cam portion" and the "coupling portion" can be formed of materials having different strengths according to the required strength. Accordingly, selectivity of the material is improved, and the improvement in workability and the reduction in cost can be further achieved while ensuring the required strength of each member.

Other Embodiments

In other embodiments, the "output unit" and the "rotation portion" may be formed of a material having the same strength.

In other embodiments, the "rotation portion" may not be thermally treated.

The above multiple embodiments may be combined as long as there is no obstructive factor on the configuration. For example, the third embodiment and the fourth embodiment may be combined, the "joint portion" of the "rotation portion" and the "output unit" may be located in the "space", and the "rotation portion" may include the "coupling portion" that couples the "cam portion" and the "output unit".

In other embodiments, the "speed reducer" is not limited to the 3k-type strange planetary gear speed reducer, and may be a 2kh-type strange planetary gear speed reducer (see FIG. 3), or a planetary gear speed reducer other than the strange planetary gear speed reducer.

In other embodiments, the drive cam 40 as a "rotation portion" may not include the drive cam outer cylinder portion 44. In addition, the second ring gear 35 as an "output unit" may not include the gear inner cylinder portion 355.

In other embodiments, the "seal member" may not be provided.

In other embodiments, the number of drive cam grooves 400 and the number of driven cam grooves 500 may be any number as long as the number of drive cam grooves 400 and the number of driven cam grooves 500 are three or more. In addition, the number of balls 3 may be adjusted according to the number of drive cam grooves 400 and the driven cam grooves 500.

The present disclosure can be applied not only to the vehicle that travels by the drive torque from the internal combustion engine, but also to an electric vehicle, a hybrid vehicle, or the like that can travel by a drive torque from a motor.

In other embodiments, the torque may be input from the "second transmission portion", and output from the "first transmission portion" via the "clutch". In addition, for example, when one of the "first transmission portion" and the "second transmission portion" is non-rotatably fixed, the rotation of the other of the "first transmission portion" and the "second transmission portion" can be stopped by making the "clutch" to the engaged state. In this case, the clutch device can be used as a brake device.

As described above, the present disclosure is not limited to the above embodiments, and can be implemented in various forms within a scope not departing from the concept of the present disclosure.

The control unit of the clutch device and the method thereof described in the present disclosure may be implemented by a dedicated computer that is provided by configuring a processor and a memory programmed to execute multiple functions embodied by a computer program. Alternatively, the control unit of the clutch device and the method thereof described in the present disclosure may be implemented by a dedicated computer provided by configuring a processor with one or more dedicated hardware logic circuits. Alternatively, the control unit of the clutch device and the method thereof described in the present disclosure may be implemented by one or more dedicated computers configured by a combination of a processor and a memory programmed to execute one or multiple functions and a processor configured by one or more hardware logic circuits. In addition, the computer program may be stored in a computer-readable non-transitional tangible recording medium as an instruction executed by a computer.

The present disclosure has been described, based on the embodiments. However, the present disclosure is not limited to the embodiments and the structures. The present disclosure also includes various modification examples and modifications within the scope of equivalents. In addition, various combinations and forms, and further, other combinations and forms which include only one element, more elements, or less elements are included in the scope and the spirit of the present disclosure.

What is claimed is:

1. A clutch actuator to be used in a clutch device, the clutch device including a clutch provided between a first transmission portion and a second transmission portion that are rotatable relative to each other and whose state is changeable to an engaged state in which torque transmission between the first transmission portion and the second transmission portion is permitted or a non-engaged state in which the torque transmission between the first transmission portion and the second transmission portion is blocked, the clutch actuator comprising:
   a housing;
   a prime mover provided in the housing and configured to operate by energization and output a torque;
   a speed reducer configured to output the torque of the prime mover at a reduced speed; and
   a rotational translation unit including a rotation portion, which is configured to rotate relative to the housing when the torque output from the speed reducer is input, and a translation portion, which is configured to move relative to the housing in an axial direction when the rotation portion rotates relative to the housing and change the state of the clutch to the engaged state or the non-engaged state, wherein
   the speed reducer includes an output unit configured to output the decelerated torque of the prime mover to the rotation portion,
   the rotation portion is formed separately from the output unit and formed of a material different from a material of the output unit,
   the rotation portion is configured to rotate integrally with the output unit,
   the rotation portion includes
     a drive cam main body in an annular plate shape,
     a drive cam inner cylinder portion in a cylindrical shape and extending in an axial direction from an outer edge portion of the drive cam main body, and
     a drive cam plate portion in an annular plate shape and extending to a radially outer side from an end portion of the drive cam inner cylinder portion on a side opposite to the drive cam main body,
   the rotation portion is provided integrally with the output unit and is not rotatable relative to the output unit,
   the rotation portion includes a drive cam outer cylinder portion extending from an outer edge portion of the drive cam plate portion in the axial direction,
   the output unit includes
     a gear inner cylinder portion in a cylindrical shape,
     a gear plate portion in an annular plate shape and extending to a radially outer side from one end of the gear inner cylinder portion, and
     a gear outer cylinder portion in a cylindrical shape and extending from an outer edge portion of the gear plate portion in the axial direction, and
   an inner peripheral wall of the gear inner cylinder portion is fitted to an outer peripheral wall of the drive cam outer cylinder portion.

2. The clutch actuator according to claim 1, further comprising:
   a drive cam outer cylinder portion in a cylindrical shape, extending in an axial direction from an outer edge portion of the drive cam plate portion, and coupled to the output unit.

3. The clutch actuator according to claim 1, further comprising:
a rolling body configured to roll between the drive cam main body and the translation portion.

4. The clutch actuator according to claim 3, wherein the rotation portion includes the drive cam main body, which has a portion on which the rolling body is configured to roll, and the drive cam plate portion, which is formed separately from the drive cam main body, formed of a material different from a material of the drive cam main body, and couples the drive cam main body and the output unit.

5. The clutch actuator according to claim 1, wherein the material of the output unit and the material of the rotation portion have different strengths according to required strengths.

6. The clutch actuator according to claim 5, wherein the rotation portion is thermally treated.

7. The clutch actuator according to claim 1, further comprising:
a seal member configured to maintain a space between the housing and the rotation portion in an airtight manner or a liquid-tight manner, wherein
the prime mover is provided in the space, and
a joint portion between the rotation portion and the output unit is located in the space.

8. The clutch actuator according to claim 1, wherein the speed reducer is a strange planetary gear speed reducer or a planetary gear speed reducer.

9. The clutch actuator according to claim 8, wherein the speed reducer includes:
a sun gear configured to input the torque from the prime mover;
a planetary gear configured to revolve in a circumferential direction of the sun gear while meshing with the sun gear and rotating on its axis;
a carrier configured to rotatably support the planetary gear and rotate relative to the sun gear;
a first ring gear configured to mesh with the planetary gear; and
a second ring gear configured to mesh with the planetary gear, formed such that a number of teeth of a tooth portion is different from that of the first ring gear, and configured to output a torque to the rotation portion, and
the output unit is the second ring gear.

10. The clutch actuator according to claim 1, wherein the rotation portion is fixed to the output unit and is not movable relative to the output unit.

* * * * *